US010111239B2

(12) United States Patent
Lei et al.

(10) Patent No.: US 10,111,239 B2
(45) Date of Patent: Oct. 23, 2018

(54) RADIO RESOURCE MANAGEMENT METHOD, MANAGEMENT DEVICE, MONITORING METHOD, AND MONITORING DEVICE

(71) Applicant: Yulong Computer Telecommunication Scientific (Shenzhen) Co., Ltd., Shenzhen, Guangdong (CN)

(72) Inventors: Yixue Lei, Guangdong (CN); Chenlu Zhang, Guangdong (CN)

(73) Assignee: Nanchang Coolpad Intelligent Technologies Company Limited, Nanchang, Jiangxi (CN)

(*) Notice: Subject to any disclaimer, the term of this patent is extended or adjusted under 35 U.S.C. 154(b) by 0 days.

(21) Appl. No.: 15/458,624

(22) Filed: Mar. 14, 2017

(65) Prior Publication Data
US 2017/0188378 A1 Jun. 29, 2017

Related U.S. Application Data

(63) Continuation-in-part of application No. PCT/CN2014/090522, filed on Nov. 6, 2014.

(51) Int. Cl.
*H04W 72/08* (2009.01)
*H04W 72/04* (2009.01)

(52) U.S. Cl.
CPC ......... *H04W 72/085* (2013.01); *H04W 72/04* (2013.01)

(58) Field of Classification Search
CPC . H04W 36/0083; H04W 36/08; H04W 36/26; H04W 36/0088; H04W 16/08;
(Continued)

(56) References Cited

U.S. PATENT DOCUMENTS 9,826,563 B2 * 11/2017 Sheng .................. H04W 4/70
2007/0147320 A1 * 6/2007 Sattari .................. H04L 47/14
370/338
(Continued)

FOREIGN PATENT DOCUMENTS

| CN | 101146343 A | 3/2008 |
| CN | 103210593 A | 7/2013 |

(Continued)

OTHER PUBLICATIONS

Ericsson: "D2D Broadcast Control Information and Related Procedures", 3GPP Draft; R1-142401 D2D Broadcast, 3rd Generation Partnership Project (3GPP), Mobile Competence Centre; 650, Route Des Lucioles; F-06921 Sophia-Antipolis Cedex; France, vol. RAN WG1, No. Seoul, Korea; May 19, 2014-May 23, 2014 May 18, 2014 (May 18, 2014), XP050789519, Retrieved from the Internet: URL: http://www.3gpp.org/ftp/Meetings_3GPP_SYNC/RAN1/RAN1/Docs/; sections 2, 3.1.
(Continued)

*Primary Examiner* — Nizar Sivji
(74) *Attorney, Agent, or Firm* — Young Basile Hanlon & MacFarlane, P.C.

(57) ABSTRACT

A radio resource management method, a radio resource management device, an equipment having base station functionality, a radio resource monitoring method, a radio resource monitoring device, and a terminal are provided. The method includes a first radio resource of the serving cell in which a terminal is located, and a second radio resource of any one of the neighboring cells in neighboring cells of the serving cell, are obtained; the first radio resource and the second radio resource are differentiated to obtain a target radio resource, and the target radio resource is transmitted to the terminal.

6 Claims, 6 Drawing Sheets

(58) Field of Classification Search
CPC . H04W 28/0268; H04W 28/08; H04W 28/26; H04W 36/0005; H04W 36/30; H04W 88/08; H04W 92/02; H04W 72/1284; H04W 72/085; H04W 72/04; H04L 47/14; H04B 7/024
See application file for complete search history.

(56) References Cited

U.S. PATENT DOCUMENTS

| | | | |
|---|---|---|---|
| 2013/0040683 A1* | 2/2013 | Siomina | H04W 28/0236 455/517 |
| 2014/0162668 A1 | 6/2014 | Na et al. | |
| 2015/0094064 A1* | 4/2015 | Lei | H04W 76/023 455/436 |
| 2016/0007304 A1 | 1/2016 | Morita | |
| 2016/0014642 A1* | 1/2016 | Liang | H04W 36/0022 370/331 |
| 2017/0078898 A1* | 3/2017 | Huang | H04W 24/02 |
| 2017/0150480 A1* | 5/2017 | Kim | H04W 4/70 |
| 2017/0285105 A1* | 10/2017 | Uemura | G01R 31/31903 |

FOREIGN PATENT DOCUMENTS

| | | |
|---|---|---|
| CN | 103781050 A | 5/2014 |
| GB | 2358550 A | 7/2001 |
| WO | 2013/120267 A1 | 8/2013 |
| WO | 2014129450 A1 | 8/2014 |

OTHER PUBLICATIONS

Samsung: "D2D synchronization procedure for in-network coverage", 3GPP Draft; R1-143104 D2D Synchronization Procedure for In-Network Coverage, 3rd Generation Partnership Project (3GPP), Mobile Competence Centre; 650, Route Des Lucioles; F-06921 Sophia-Antipolis CE, vol. RAN WG1, No. Dresden, Germany; Aug. 18, 2014-Aug. 22, 2014 Aug. 17, 2014 (Aug. 17, 2014), XP050788582, Retrieved from the Internet: URL: http://www.3gpp.org/ftp/Meetings_3GPP_SYNC/RAN1/Docs/; sections 2.1, 2.2.

Huawei: "RAN3 Considerations for Proximity Discovery", 3GPP Draft; R3-140266 RAN3 Considerations for Proximity Discovery, 3rd Generation Partnership Project (3GPP), Mobile Competence Centre; 650, Route Des Lucioles; F-06921 Sophia-Antipolis Cedex; France, vol. Ran WG3, No. Prague, Czech Republic; Feb. 10, 2014-Feb. 14, 2014 Feb. 9, 2014 (Feb. 9, 2014), XP050738706, Retrieved from the Internet: URL: http://www.3gpp.org/ftp/Meetings_3GPP_SYNC/Ran/RAN3/Docs/; sections 2 and 3.

* cited by examiner

RADIO RESOURCE MANAGEMENT METHOD, MANAGEMENT DEVICE, MONITORING METHOD, AND MONITORING DEVICE

CROSS-REFERENCE TO RELATED APPLICATION(S)

This application is a continuation-in-part of International Application No. PCT/CN2014/090522 filed on Nov. 6, 2014, the content of which is herein incorporated by reference.

TECHNICAL FIELD

The present disclosure relates to the field of radio resource technology, and more particularly, to a radio resource management method, a radio resource management device, an equipment having base station functionality, a radio resource monitoring method, a radio resource monitoring device, and a terminal.

BACKGROUND

With the development of software and hardware technology for mobile terminals and wireless communication technology, the device to device (D2D) technology has become a very important technical discussion point in the 3rd generation partnership project (3GPP) in recent years. The D2D technology includes D2D discovery and D2D communication. Signaling processes and business processes for the D2D communication and the D2D discovery are mutually independent. The D2D discovery can be provided to a user as a business individually, which can help a user to search and obtain neighboring users having the same interest point with the user, so that the user can use a certain social networking service (SNS) business, such as the Facebook. For the D2D discovery, a discovery mechanism of D2D located in the coverage of a network is mainly discussed in 3GPP Rel (Release)-12.

SUMMARY

Based on the above problems, the present disclosure aims to provide a new technical solution, which can enable a UE to identify a radio resource of any cell, so that a terminal can avoid blindly monitoring the radio resources of all cells; at the same time, according to the current actual location of the UE, its mobility, and/or the reception power and reception quality of the reference signals of neighboring cells, the UE determines the monitoring frequency of the neighboring cells, while not needing to monitor the resource pool information of each of the neighboring cells at the same frequency; thus the monitoring overhead of the UE and the radio resource overhead of the system are reduced.

In order to achieve the above purpose, the present disclosure provides a radio resource management method applied to an equipment having base station functionality. Wherein, the radio resource management method includes: obtaining a first radio resource of a serving cell in which a terminal is located, and a second radio resource of any one of neighboring cells in a plurality of neighboring cells adjacent to the serving cell; and differentiating the first radio resource and the second radio resource to obtain a target radio resource, and transmitting the target radio resource to the terminal.

In the technical solution, since the first radio resource of the serving cell in which the terminal is located and a second radio resource of any one of the neighboring cells in the plurality of the neighboring cells adjacent to the serving cell are differentiated to obtain the target radio resource, and the target radio resource is transmitted to the terminal through a SIB, the terminal can determine radio resources (the resource pool information) corresponding to the serving cell and any one of the neighboring cells, so as to lay the foundation for supporting that the terminal can accurately choose radio resources that need to be monitored from the target radio resource according to current information and monitored reference signal received power (RSRP) and/or monitored reference signal received quality (RSRQ) of the neighboring cells, so that the terminal can avoid blindly monitoring all radio resources. Thus, the monitoring overhead of the terminal is reduced and the monitoring burden of the terminal is relieved. Of course, it should be understood for persons having ordinary skill in the art that there are many ways to realize that the first radio resource and the second radio resource are differentiated to enable the terminal to identify a radio resource corresponding to any cell; that is, the way for differentiating the first radio resource and the second radio resource to enable the terminal to identify a radio resource corresponding to any cell at least includes, but not limited to: adding identifications to the radio resources of the serving cell and any one of the neighboring cells; or, placing the radio resources of the serving cell and any one of the neighboring cells in different locations of the SIB and broadcasting the radio resources.

In the above mentioned technical solution, the step of the first radio resource and the second radio resource are differentiated to obtain a target radio resource may specifically include: differentiating between the same radio resources and different radio resources of both the first radio resource and the second radio resource, marking differentiated same radio resources and differentiated different radio resources respectively so as to identify target cells that the same radio resources belong to and target cells that the different radio resources belong to, and taking marked same radio resources and marked different radio resources as the target radio resource; wherein, the target cell can be the serving cell or any one of the neighboring cells.

In the technical solution, by means of differentiating between the same radio resources and different radio resources of both the first radio resource and the second radio resource, and marking (such as employing a Delta incremental method for instructions) differentiated same radio resources and differentiated different radio resources respectively, the same radio resources are broadcasted only once when the target radio resource is broadcasted to the terminal, and the terminal can identify a target cell that each part of radio resources belongs to in the same radio resources and the different radio resources, namely, the terminal can identify the target cell corresponding to each part of the radio resources in the same radio resources and the different radio resources, which is not only beneficial to reduce the system overhead, but also enables the terminal to avoid blindly monitoring all radio resources. Thus, the monitoring overhead of the terminal is reduced and the monitoring burden of the terminal is relieved.

In the above mentioned technical solution, the step of the first radio resource and the second radio resource are differentiated to obtain a target radio resource may also specifically include: determining periodically whether the first radio resource and/or the second radio resource change(s) or not, obtaining a first changed radio resource corresponding to the first radio resource and/or obtaining a second changed radio resource corresponding to the second radio resource when the first radio resource and/or the second radio resource change(s), differentiating the first changed radio resource and/or the second changed radio resource, and taking differentiated first changed radio resource and/or differentiated second changed radio resource as the target radio resource.

In the technical solution, by means of only broadcasting changed radio resources of the serving cell (namely the first changed radio resource) and/or changed radio resources of any one of the neighboring cells (namely the second changed radio resource), a UE (such as a terminal) can avoid receiving all SIBs or updating the system information in a connected state. Thus, the system overhead is reduced, and the terminal can only monitor changed radio resources of any cell, which can further reduce the monitoring overhead of the UE.

The present disclosure also provides a radio resource management device applied to an equipment having base station functionality. The radio resource management device includes an obtaining unit, which is configured to obtain a first radio resource of a serving cell in which a terminal is located, and a second radio resource of any one of neighboring cells in a plurality of neighboring cells adjacent to the serving cell; and a differentiating unit, which is configured to differentiate the first radio resource and the second radio resource to obtain a target radio resource, and transmit the target radio resource to the terminal.

In the technical solution, since the first radio resource of the serving cell in which the terminal is located and a second radio resource of any one of the neighboring cells in the plurality of the neighboring cells adjacent to the serving cell are differentiated to obtain the target radio resource, and the target radio resource is transmitted to the terminal through a SIB, the terminal can determine radio resources (the resource pool information) corresponding to the serving cell and any one of the neighboring cells, so as to lay the foundation for supporting that the terminal can accurately choose radio resources that need to be monitored from the target radio resource according to current information and monitored RSRP and/or monitored RSRQ of the neighboring cells, so that the terminal can avoid blindly monitoring all radio resources. Thus, the monitoring overhead of the terminal is reduced and the monitoring burden of the terminal is relieved. Of course, it should be understood for persons having ordinary skill in the art that there are many ways to realize that the first radio resource and the second radio resource are differentiated to enable the terminal to identify a radio resource corresponding to any cell; that is, the way for differentiating the first radio resource and the second radio resource to enable the terminal to identify a radio resource corresponding to any cell at least includes, but not limited to: adding identifications to the radio resources of the serving cell and any one of the neighboring cells; or, placing the radio resources of the serving cell and any one of the neighboring cells in different locations of the SIB and broadcasting the radio resources.

In the above mentioned technical solution, the differentiating unit is specifically configured to: differentiate between the same radio resources and different radio resources of both the first radio resource and the second radio resource, mark differentiated same radio resources and differentiated different radio resources respectively so as to identify target cells that the same radio resources belong to and target cells that the different radio resources belong to, and take marked same radio resources and marked different radio resources as the target radio resource; wherein, the target cell can be the serving cell or any one of the neighboring cells.

In the technical solution, by means of differentiating between the same radio resources and different radio resources of both the first radio resource and the second radio resource, and marking (such as employing a Delta incremental method for instructions) differentiated same radio resources and differentiated different radio resources respectively, the same radio resources are broadcasted only once when the target radio resource is broadcasted to the terminal, and the terminal can identify a target cell that each part of radio resources belongs to in the same radio resources and the different radio resources, namely, the terminal can identify the target cell corresponding to each part of the radio resources in the same radio resources and the different radio resources, which is not only beneficial to reduce the system overhead, but also enables the terminal to avoid blindly monitoring all radio resources. Thus, the monitoring overhead of the terminal is reduced and the monitoring burden of the terminal is relieved.

In the above mentioned technical solution, the differentiating unit is also specifically configured to: determine periodically whether the first radio resource and/or the second radio resource change(s) or not, obtain a first changed radio resource corresponding to the first radio resource and/or obtain a second changed radio resource corresponding to the second radio resource when the first radio resource and/or the second radio resource change(s), differentiate the first changed radio resource and/or the second changed radio resource, and take differentiated first changed radio resource and/or differentiated second changed radio resource as the target radio resource.

In the technical solution, by means of only broadcasting changed radio resources of the serving cell (namely the first changed radio resource) and/or changed radio resources of any one of the neighboring cells (namely the second changed radio resource), a UE (such as a terminal) can avoid receiving all SIBs or updating the system information in a connected state. Thus, the system overhead is reduced, and the terminal can only monitor changed radio resources of any cell, which can further reduce the monitoring overhead of the UE.

The present disclosure also provides an equipment having base station functionality. The equipment having base station functionality includes the radio resource management device as described according to any one of the above mentioned technical solutions.

In the technical solution, setting the radio resource management device in the equipment having base station functionality lays the foundation for that a terminal can accurately choose radio resources that need to be monitored from a target radio resource according to current information of the terminal and monitored RSRP and/or monitored RSRQ of neighboring cells adjacent to a serving cell in which the terminal is located, so that the terminal can avoid blindly monitoring all radio resources. Thus, the monitoring overhead of the terminal is reduced and the monitoring burden of the terminal is relieved.

The present disclosure also provides a radio resource monitoring method applied to a terminal. Wherein, the terminal is located in a serving cell controlled by the equipment having base station functionality as described according to any one of the above mentioned technical solutions. The radio resource monitoring method includes: receiving a target radio resource transmitted from an equipment having base station functionality; obtaining current information of a terminal, and determining monitoring frequency of any one of neighboring cells in a plurality of neighboring cells adjacent to a serving cell in which the terminal is located according to the current information of the terminal and monitored RSRP and/or monitored RSRQ of the any one of the neighboring cells; and determining a second radio resource of the any one of the neighboring cells according to the target radio resource, and monitoring the second radio resource of the any one of the neighboring cells at the monitoring frequency of the any one of the neighboring cells.

In the technical solution, the terminal can accurately determine the monitoring frequency of any one of the neighboring cells according to the current information of the terminal and the monitored RSRP and/or the monitored RSRQ of the any one of the neighboring cells, so as to avoid monitoring radio resources of any one of the neighboring cells at the same monitoring frequency, which is beneficial to reduce the monitoring overhead of the terminal and lower the monitoring power consumption of the terminal; on the basis that the monitoring frequency of any one of the neighboring cells is determined, since a second radio resource of the any one of the neighboring cells can be determined according to the target radio resource, the terminal can determine radio resources that needs to monitor in any one of the neighboring cells, so as to avoid resulting in an inaccurate monitoring result and higher monitoring overhead due to blindly monitoring all radio resources.

In the above mentioned technical solution, the current information includes, but not limited to: a current location that the terminal is located at and/or the mobility of the terminal; wherein, the current location can be determined according to the signal power of the equipment having base station functionality received by the terminal and/or the signal power of an equipment having base station functionality in the any one of the neighboring cells received by the terminal.

In the technical solution, the current location of the terminal can be accurately determined according to the signal power of the equipment having base station functionality in the serving cell received by the terminal and/or the signal power of an equipment having base station functionality in any one of the neighboring cells received by the terminal. For example, the terminal is located in a center coverage area of the serving cell or an edge coverage area of any one of the neighboring cells. The current location and/or the mobility of the terminal may provide a necessary reference foundation for determining the monitoring frequency of any one of the neighboring cells, which ensures that the terminal can determine the monitoring frequency of any one of the neighboring cells accurately.

In the above mentioned technical solution, the step of determining monitoring frequency of any one of neighboring cells in a plurality of neighboring cells adjacent to a serving cell in which the terminal is located may specifically include: when the terminal is served as low mobility, that is, the mobility of the terminal is poor, namely, the frequency of the terminal crossing the cells is lower, if the signal power of the equipment having base station functionality in the serving cell is greater than or equal to first preset signal power, and/or the RSRP of the any one of the neighboring cells is less than or equal to preset received power and/or the RSRQ of the any one of the neighboring cells is less than or equal to preset received quality, setting the monitoring frequency of the any one of the neighboring cells as 0, or lowering the monitoring frequency of the any one of the neighboring cells to first monitoring frequency; when the mobility of the terminal is the low mobility, that is, the mobility of the terminal is poor, if the signal power of an equipment having base station functionality in the any one of the neighboring cells is greater than or equal to second preset signal power, increasing the monitoring frequency of the any one of the neighboring cells to second monitoring frequency, and reducing monitoring frequency of other neighboring cells in the plurality of the neighboring cells to third monitoring frequency or 0; wherein, the second monitoring frequency is greater than both the third monitoring frequency and the first monitoring frequency.

In the technical solution, when the mobility of the terminal is the lower mobility, if the signal power of the equipment having base station functionality in the serving cell in which the terminal is located is greater than or equal to the first preset signal power, and/or the RSRP of each of the neighboring cells in the plurality of the neighboring cells is less than or equal to the preset received power and/or the RSRQ of each of the neighboring cells in the plurality of the neighboring cells is less than or equal to the preset received quality, it is indicated that the terminal is located at a relatively central location of the coverage area of the serving cell, and is relatively far away from the coverage area of any one of the neighboring cells. At this point, the terminal only needs to monitor the serving cell while not needing to monitor any one of the neighboring cells (namely the monitoring frequency of any one of the neighboring cells is equal to 0) or the terminal can reduce the monitoring frequency of any one of the neighboring cells, so as to reduce the monitoring overhead and relieve the monitoring burden in real time; if the signal power of an equipment having base station functionality in any one of the neighboring cells is greater than or equal to the second preset signal power, it is indicated that the terminal is located in an edge coverage area of the any one of the neighboring cells, and is far away from the center of the serving cell and the coverage area of other neighboring cells. Then, the terminal only needs to monitor the serving cell and the any one of the neighboring cells while not needing to monitor the other neighboring cells. Hence, the monitoring frequency of the any one of the neighboring cells needs to be increased to the second monitoring frequency, and the monitoring frequency of the other neighboring cells in the plurality of the neighboring cells needs to be reduced to such as the third monitoring frequency or 0. Thus, the monitoring overhead of the terminal can be efficiently reduced, and the monitoring intensity and the monitoring effect for any one of the neighboring cells are guaranteed.

In the above mentioned technical solution, the step of determining monitoring frequency of any one of neighboring cells in a plurality of neighboring cells adjacent to a serving cell in which the terminal is located may also specifically include: when the terminal is served as high mobility, that is, the mobility of the terminal is high, namely, the frequency of the terminal crossing the cells is higher, increasing the monitoring frequency of the any one of the neighboring cells to fourth monitoring frequency; wherein, the fourth monitoring frequency is greater than the first monitoring frequency.

In the technical solution, when the mobility of the terminal is high, it is indicated that the frequency of the terminal crossing the cells is higher, namely, the terminal may pass through one cell to another frequently. At this time, in order that the terminal can efficiently monitor the radio resources of any one of the neighboring cells, the monitoring frequency of any one of the neighboring cells needs to be increased moderately.

The present disclosure also provides a radio resource monitoring device applied to a terminal. Wherein, the terminal is located in a serving cell controlled by the equipment having base station functionality as described according to any one of the above mentioned technical solutions. The radio resource monitoring device includes: a receiving unit, which is configured to receive a target radio resource transmitted from an equipment having base station functionality; an obtaining unit, which is configured to obtain current information of a terminal; a determining unit, which is configured to determine monitoring frequency of any one of neighboring cells in a plurality of neighboring cells adjacent to a serving cell in which the terminal is located according to the current information of the terminal and monitored RSRP and/or monitored RSRQ of the any one of the neighboring cells; and a monitoring unit, which is configured to determine a second radio resource of the any one of the neighboring cells according to the target radio resource, and monitor the second radio resource of the any one of the neighboring cells at the monitoring frequency of the any one of the neighboring cells.

In the technical solution, the terminal can accurately determine the monitoring frequency of any one of the neighboring cells according to the current information of the terminal and the monitored RSRP and/or the monitored RSRQ of the any one of the neighboring cells, so as to avoid monitoring radio resources of any one of the neighboring cells at the same monitoring frequency, which is beneficial to reduce the monitoring overhead of the terminal and lower the monitoring power consumption of the terminal; on the basis that the monitoring frequency of any one of the neighboring cells is determined, since the second radio resource of the any one of the neighboring cells can be determined according to the target radio resource, the terminal can determine radio resources that needs to monitor in any one of the neighboring cells, so as to avoid resulting in an inaccurate monitoring result and higher monitoring overhead due to blindly monitoring all radio resources.

In the above mentioned technical solution, the current information includes, but not limited to: a current location that the terminal is located at and/or the mobility of the terminal; the determining unit is configured to determine the current location according to the signal power of the equipment having base station functionality received by the terminal and/or the signal power of an equipment having base station functionality in the any one of the neighboring cells received by the terminal.

In the technical solution, the current location of the terminal can be accurately determined according to the signal power of the equipment having base station functionality in the serving cell received by the terminal and/or the signal power of an equipment having base station functionality in any one of the neighboring cells received by the terminal. For example, the terminal is located in a center coverage area of the serving cell or an edge coverage area of any one of the neighboring cells. The current location and/or the mobility of the terminal may provide a necessary reference foundation for determining the monitoring frequency of any one of the neighboring cells, which ensures that the terminal can determine the monitoring frequency of any one of the neighboring cells accurately.

In the above mentioned technical solution, the determining unit is specifically configured to: when the terminal is served as low mobility, that is, the mobility of the terminal is poor, namely, the frequency of the terminal crossing the cells is lower, if the signal power of the equipment having base station functionality in the serving cell is greater than or equal to first preset signal power, and/or the RSRP of the any one of the neighboring cells is less than or equal to preset received power and/or the RSRQ of the any one of the neighboring cells is less than or equal to preset received quality, set the monitoring frequency of the any one of the neighboring cells as 0, or lower the monitoring frequency of the any one of the neighboring cells to first monitoring frequency; when the mobility of the terminal is the low mobility, that is, the mobility of the terminal is poor, if the signal power of an equipment having base station functionality in the any one of the neighboring cells is greater than or equal to second preset signal power, increase the monitoring frequency of the any one of the neighboring cells to second monitoring frequency, and reduce monitoring frequency of other neighboring cells in the plurality of the neighboring cells to third monitoring frequency or 0; wherein, the second monitoring frequency is greater than both the third monitoring frequency and the first monitoring frequency.

In the technical solution, when the mobility of the terminal is the lower mobility, if the signal power of the equipment having base station functionality in the serving cell in which the terminal is located is greater than or equal to the first preset signal power, and/or the RSRP of each of the neighboring cells in the plurality of the neighboring cells is less than or equal to the preset received power and/or the RSRQ of each of the neighboring cells in the plurality of the neighboring cells is less than or equal to the preset received quality, it is indicated that the terminal is located at a relatively central location of the coverage area of the serving cell, and is relatively far away from the coverage area of any one of the neighboring cells. At this point, the terminal only needs to monitor the serving cell while not needing to monitor any one of the neighboring cells (namely the monitoring frequency of any one of the neighboring cells is equal to 0) or the terminal can reduce the monitoring frequency of any one of the neighboring cells, so as to reduce the monitoring overhead and relieve the monitoring burden in real time; if the signal power of an equipment having base station functionality in any one of the neighboring cells is greater than or equal to the second preset signal power, it is indicated that the terminal is located in the edge of the any one of the neighboring cells, and is far away from the center of the serving cell and the coverage area of other neighboring cells. Then, the terminal only needs to monitor the serving cell and the any one of the neighboring cells while not needing to monitor the other neighboring cells. Hence, the monitoring frequency of the any one of the neighboring cells needs to be increased to the second monitoring frequency, and the monitoring frequency of the other neighboring cells in the plurality of the neighboring cells needs to be reduced to such as the third monitoring frequency or 0. Thus, the monitoring overhead of the terminal can be efficiently reduced, and the monitoring intensity and the monitoring effect for any one of the neighboring cells are guaranteed.

In the above mentioned technical solution, the determining unit is also specifically configured to: when the terminal is served as high mobility, that is, the mobility of the terminal is high, namely, the frequency of the terminal crossing the cells is higher, increase the monitoring frequency of the any one of the neighboring cells to fourth monitoring frequency; wherein, the fourth monitoring frequency is greater than the first monitoring frequency.

In the technical solution, when the mobility of the terminal is high, it is indicated that the frequency of the terminal crossing the cells is higher, namely, the terminal may pass through one cell to another frequently. At this time, in order that the terminal can efficiently monitor the radio resources of any one of the neighboring cells, the monitoring frequency of any one of the neighboring cells needs to be increased moderately.

The present disclosure also provides a terminal. The terminal includes the radio resource monitoring device as described according to any one of the above mentioned technical solutions.

In the technical solution, by means of setting the radio resource monitoring device in the terminal, the terminal can accurately determine monitoring frequency of any one of neighboring cells in a plurality of neighboring cells adjacent to a serving cell in which the terminal is located, so as to avoid monitoring radio resources of any one of the neighboring cells at the same monitoring frequency, which is beneficial to reduce the monitoring overhead of the terminal and lower the monitoring power consumption of the terminal; at the same time, the terminal can determine radio resources that needs to monitor in any one of the neighboring cells, so as to avoid resulting in an inaccurate monitoring result and higher monitoring overhead due to blindly monitoring all radio resources.

The technical solutions of the present disclosure enable a UE to identify a radio resource of any cell, so that a terminal can avoid blindly monitoring the radio resources of all cells; at the same time, according to the current actual location of the UE, its mobility, and/or the reception power and reception quality of the reference signals of neighboring cells, the UE determines the monitoring frequency of the neighboring cells, while not needing to monitor the resource pool information of each of the neighboring cells at the same frequency; thus the monitoring overhead of the UE and the radio resource overhead of the system are reduced.

DETAILED DESCRIPTION

In order that the above mentioned aims, features and advantages of the present disclosure can be understood more clearly, the present disclosure will now be described in detail on the basis of preferred implementations and drawings. It should be noted that, in the case of no conflict, the implementations of the present disclosure and the features of each implementation can be combined mutually.

In order that the present disclosure can be fully understood, lots of specific details will be illustrated in the following descriptions. In fact, the present disclosure can be also realized in other ways which are different to the ways described below. Therefore, it is to be understood that various changes may be made without departing from the spirit and scope of the disclosure.

Figure 1:
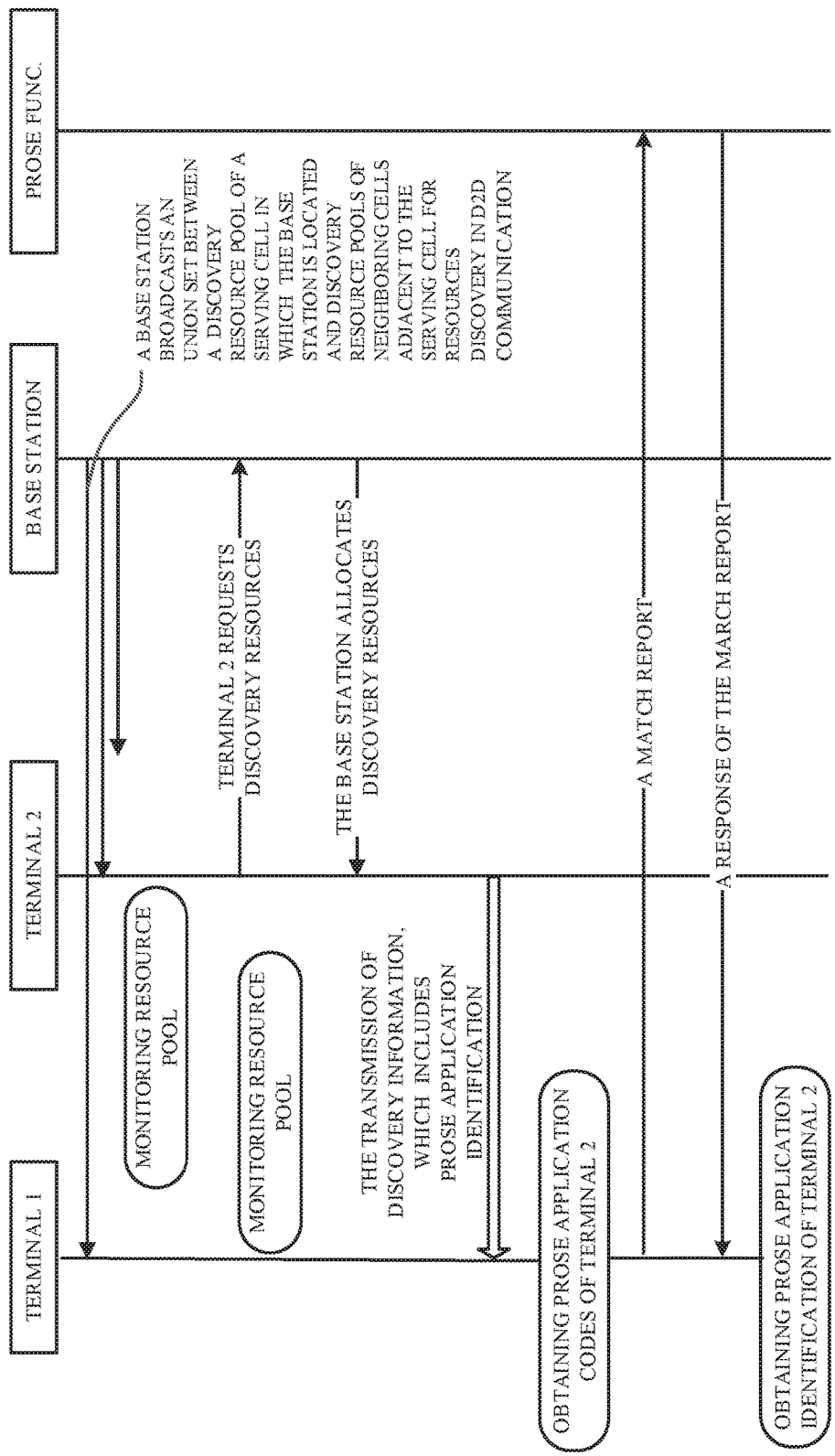
FIG. 1 is an end-to-end signaling flowchart of a D2D discovery mechanism made in 3GPP Rel-12 according to the prior art.

A signaling flowchart of the discovery mechanism is shown in FIG. 1.

In 3GPP Rel-12, the discovery mechanism is discussed as shown in FIG. 1 of an existing technical solution. According to the signaling flowchart as shown in FIG. 1, how to monitor, by a D2D user equipment (UE), discovery signals transmitted by other D2D UEs in a specific resource pool is a key technology point of the D2D discovery. In Rel-12, for realizing basic discovery functionality, a baseline solution is made, namely, an equipment having base station functionality (such as an evolved node B (eNB)) needs to calculate an union set between a discovery resource pool of a serving cell and discovery resource pools of neighboring cells, and then the union set is broadcasted to terminals located in the serving cell and the neighboring cells. At the same time, a UE needs to monitor all resource pools in the union set between the discovery resource pools of the serving cell and the neighboring cells.

Although the above mentioned monitoring method for monitoring the resource pools of the neighboring cells based on a union result of the resource pools is simple, it also brings the following problems.

1) Higher monitoring overhead for the UEs; if the number of the neighboring cells is relatively more, and configurations of the resource pools are different from each other, thus the union set of the resource pools is relatively larger, the elements (such as the resource pools) included in the union set is more, namely the number of the resource pools that a UE needs to monitor is relatively more; that is, the larger the union set of the resource pools is, the more the number of the resource pools that a UE needs to monitor.

2) Higher system overhead; if the number of the neighboring cells is relatively more, when a certain resource pool changes, the union set may subsequently change, thus resource pool information that needs to be broadcasted by the eNB (the equipment having base station functionality) may also change, which leads to that the D2D UE needs to receive all system information blocks (SIBs) or to update the system information in a connected state.

3) For a cell with a wider coverage area, when the mobility of a UE located in the cell is relatively poor, it is almost impossible for the UE to access the coverage area of the neighboring cells. At this time, it is useless for the UE to monitor the resource pool information of the neighboring cells. However, if a cell that the UE is about to access is only one of the neighboring cells, it is also useless for the UE to monitor the resource pool information of other neighboring cells, and monitoring overhead of the UE will be increased.

Therefore, how to reduce the monitoring overhead of a UE, and enable the UE to determine monitoring frequency of neighboring cells according to the actual situation while not needing to monitor the resource pool information of any one of the neighboring cells at the same monitoring frequency, is a technical problem to be solved for persons having ordinary skill in the art.

Figure 2:
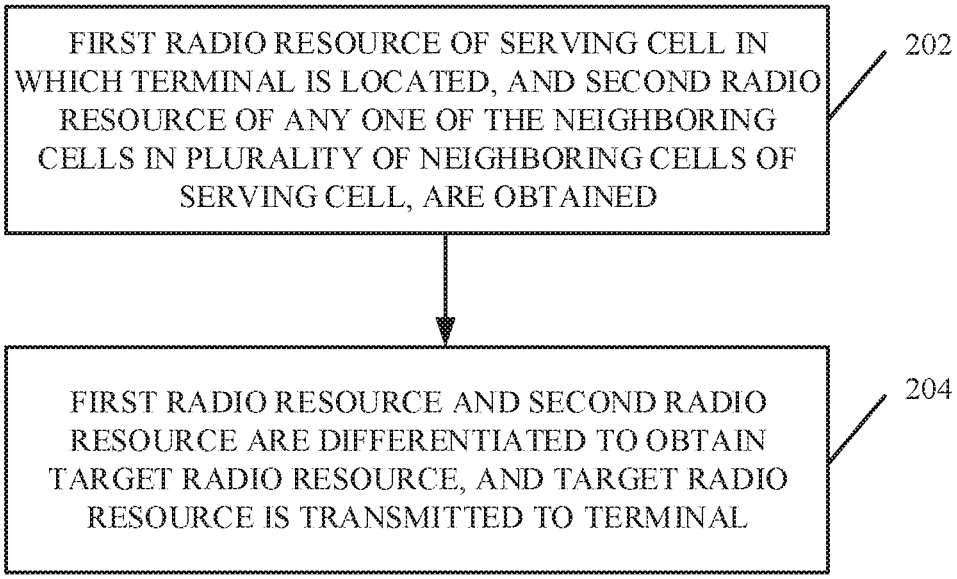
FIG. 2 is a flowchart of a radio resource management method according to an implementation of the present disclosure.

Referring to FIG. 2, FIG. 2 is a flowchart of a radio resource management method according to an implementation of the present disclosure.

As shown in FIG. 2, the radio resource management method according to an implementation of the present disclosure, includes: step 202, a first radio resource of a serving cell in which a terminal is located, and a second radio resource of any one of neighboring cells in a plurality of neighboring cells adjacent to the serving cell, are obtained; step 204, the first radio resource and the second radio resource are differentiated to obtain a target radio resource, and the target radio resource is transmitted to the terminal.

In the technical solution, since the first radio resource of the serving cell in which the terminal is located and a second radio resource of any one of the neighboring cells in the plurality of the neighboring cells adjacent to the serving cell are differentiated to obtain the target radio resource, and the target radio resource is transmitted to the terminal through a SIB, the terminal can determine radio resources (the resource pool information) corresponding to the serving cell and any one of the neighboring cells, so as to lay the foundation for supporting that the terminal can accurately choose radio resources that need to be monitored from the target radio resource according to current information and monitored RSRP and/or monitored RSRQ of the neighboring cells, so that the terminal can avoid blindly monitoring all radio resources. Thus, the monitoring overhead of the terminal is reduced and the monitoring burden of the terminal is relieved. Of course, it should be understood for persons having ordinary skill in the art that there are many ways to realize that the first radio resource and the second radio resource are differentiated to enable the terminal to identify a radio resource corresponding to any cell; that is, the way for differentiating the first radio resource and the second radio resource to enable the terminal to identify a radio resource corresponding to any cell at least includes, but not limited to: adding identifications to the radio resources of the serving cell and any one of the neighboring cells; or, placing the radio resources of the serving cell and any one of the neighboring cells in different locations of the SIB and broadcasting the radio resources.

In the above mentioned technical solution, the step of the first radio resource and the second radio resource are differentiated to obtain a target radio resource may specifically include: differentiating between the same radio resources and different radio resources of both the first radio resource and the second radio resource, marking differentiated same radio resources and differentiated different radio resources respectively so as to identify target cells that the same radio resources belong to and target cells that the different radio resources belong to, and taking marked same radio resources and marked different radio resources as the target radio resource; wherein, the target cell can be the serving cell or any one of the neighboring cells.

In the technical solution, by means of differentiating between the same radio resources and different radio resources of both the first radio resource and the second radio resource, and marking (such as employing a Delta incremental method for instructions) differentiated same radio resources and differentiated different radio resources respectively, the same radio resources are broadcasted only once when the target radio resource is broadcasted to the terminal, and the terminal can identify a target cell that each part of radio resources belongs to in the same radio resources and the different radio resources, namely, the terminal can identify the target cell corresponding to each part of the radio resources in the same radio resources and the different radio resources, which is not only beneficial to reduce the system overhead, but also enables the terminal to avoid blindly monitoring all radio resources. Thus, the monitoring overhead of the terminal is reduced and the monitoring burden of the terminal is relieved.

In the above mentioned technical solution, the step of the first radio resource and the second radio resource are differentiated to obtain a target radio resource may also specifically include: determining periodically whether the first radio resource and/or the second radio resource change(s) or not, obtaining a first changed radio resource corresponding to the first radio resource and/or obtaining a second changed radio resource corresponding to the second radio resource when the first radio resource and/or the second radio resource change(s), differentiating the first changed radio resource and/or the second changed radio resource, and taking differentiated first changed radio resource and/or differentiated second changed radio resource as the target radio resource.

In the technical solution, by means of only broadcasting changed radio resources of the serving cell (namely the first changed radio resource) and/or changed radio resources of any one of the neighboring cells (namely the second changed radio resource), a UE (such as a terminal) can avoid receiving all SIBs or updating the system information in a connected state. Thus, the system overhead is reduced, and the terminal can only monitor changed radio resources of any cell, which can further reduce the monitoring overhead of the UE.

Figure 3:
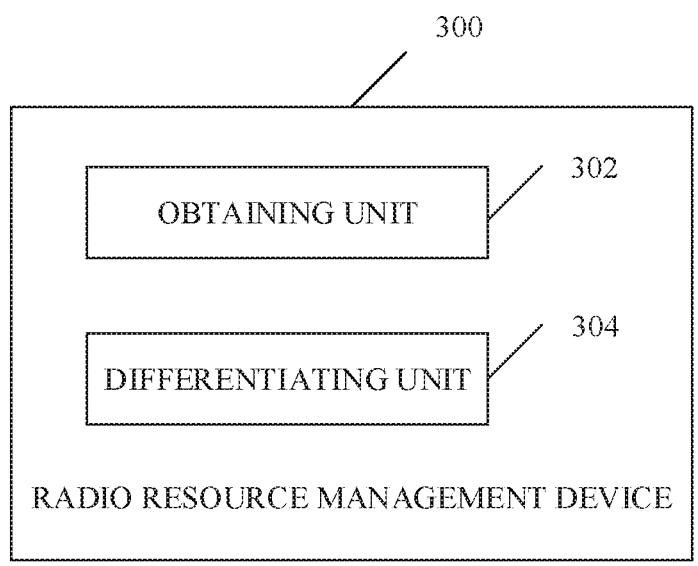
FIG. 3 is a block diagram of a radio resource management device according to an implementation of the present disclosure.

FIG. 3 is a block diagram of a radio resource management device according to an implementation of the present disclosure.

As shown in FIG. 3, the radio resource management device 300 according to an implementation of the present disclosure, includes: an obtaining unit 302, which is configured to obtain a first radio resource of a serving cell in which a terminal is located, and a second radio resource of any one of neighboring cells in a plurality of neighboring cells adjacent to the serving cell; and a differentiating unit 304, which is configured to differentiate the first radio resource and the second radio resource to obtain a target radio resource, and transmit the target radio resource to the terminal.

In the technical solution, since the first radio resource of the serving cell in which the terminal is located and a second radio resource of any one of the neighboring cells in the plurality of the neighboring cells adjacent to the serving cell are differentiated to obtain the target radio resource, and the target radio resource is transmitted to the terminal through a SIB, the terminal can determine radio resources (the resource pool information) corresponding to the serving cell and any one of the neighboring cells, so as to lay the foundation for supporting that the terminal can accurately choose radio resources that need to be monitored from the target radio resource according to current information and monitored RSRP and/or monitored RSRQ of the neighboring cells, so that the terminal can avoid blindly monitoring all radio resources. Thus, the monitoring overhead of the terminal is reduced and the monitoring burden of the terminal is relieved. Of course, it should be understood by persons having ordinary skill in the art that there are many ways to realize that the first radio resource and the second radio resource are differentiated to enable the terminal to identify a radio resource corresponding to any cell; that is, the way for differentiating the first radio resource and the second radio resource to enable the terminal to identify a radio resource corresponding to any cell at least includes, but not limited to: adding identifications to the radio resources of the serving cell and any one of the neighboring cells; or, placing the radio resources of the serving cell and any one of the neighboring cells in different locations of the SIB and broadcasting the radio resources.

In the above mentioned technical solution, the differentiating unit 304 is specifically configured to: differentiate between the same radio resources and different radio resources of both the first radio resource and the second radio resource, mark differentiated same radio resources and differentiated different radio resources respectively so as to identify target cells that the same radio resources belong to and target cells that the different radio resources belong to, and take marked same radio resources and marked different radio resources as the target radio resource; wherein, the target cell can be the serving cell or any one of the neighboring cells.

In the technical solution, by means of differentiating between the same radio resources and different radio resources of both the first radio resource and the second radio resource, and marking (such as employing a Delta incremental method for instructions) differentiated same radio resources and differentiated different radio resources respectively, the same radio resources are broadcasted only once when the target radio resource is broadcasted to the terminal, and the terminal can identify a target cell that each part of radio resources belongs to in the same radio resources and the different radio resources, namely, the terminal can identify the target cell corresponding to each part of the radio resources in the same radio resources and the different radio resources, which is not only beneficial to reduce the system overhead, but also enables the terminal to avoid blindly monitoring all radio resources. Thus, the monitoring overhead of the terminal is reduced and the monitoring burden of the terminal is relieved.

In the above mentioned technical solution, the differentiating unit 304 is also specifically configured to: determine periodically whether the first radio resource and/or the second radio resource change(s) or not, obtain a first changed radio resource corresponding to the first radio resource and/or obtain a second changed radio resource corresponding to the second radio resource when the first radio resource and/or the second radio resource change(s), differentiate the first changed radio resource and/or the second changed radio resource, and take differentiated first changed radio resource and/or differentiated second changed radio resource as the target radio resource.

In the technical solution, by means of only broadcasting changed radio resources of the serving cell (namely the first changed radio resource) and/or changed radio resources of any one of the neighboring cells (namely the second changed radio resource), a UE (such as a terminal) can avoid receiving all SIBs or updating the system information in a connected state. Thus, the system overhead is reduced, and the terminal can only monitor changed radio resources of any cell, which can further reduce the monitoring overhead of the UE.

Figure 4:
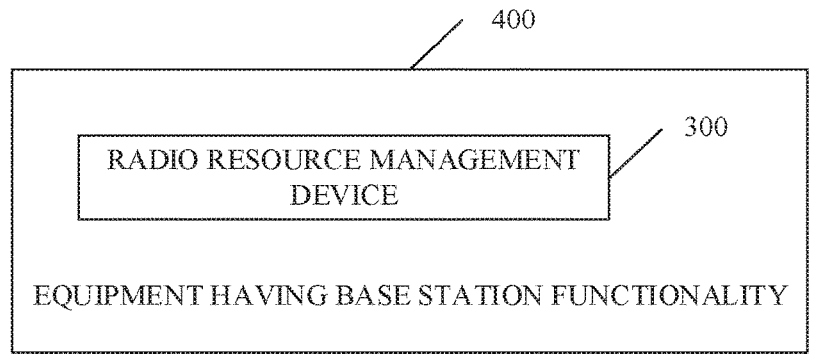
FIG. 4 is a block diagram of an equipment having base station functionality according to an implementation of the present disclosure.

FIG. 4 is a block diagram of an equipment having base station functionality according to an implementation of the present disclosure.

As shown in FIG. 4, the equipment 400 having base station functionality according to an implementation of the present disclosure includes the radio resource management device 300 as described according to any one of the above mentioned technical solutions.

In the technical solution, setting the radio resource management device 300 in the equipment 400 having base station functionality lays the foundation for that a terminal can accurately choose radio resources that need to be monitored from a target radio resource according to current information of the terminal and monitored RSRP and/or monitored RSRQ of neighboring cells adjacent to a serving cell in which the terminal is located, so that the terminal can avoid blindly monitoring all radio resources. Thus, the monitoring overhead of the terminal is reduced and the monitoring burden of the terminal is relieved.

Figure 5:
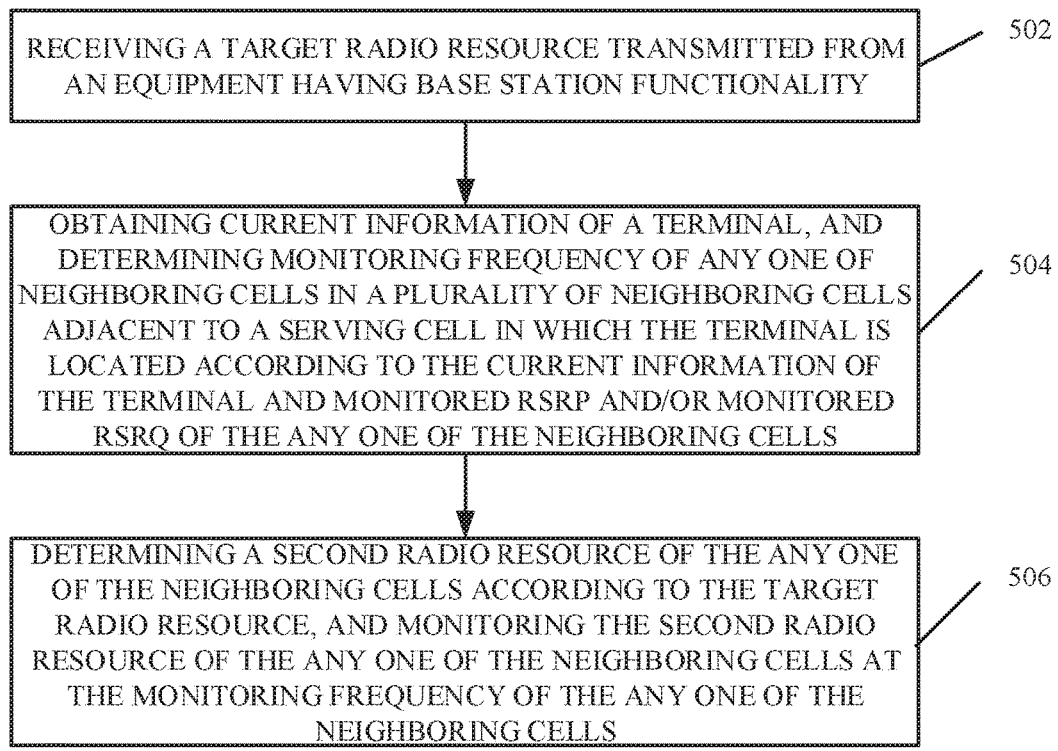
FIG. 5 is a flowchart of a radio resource monitoring method according to an implementation of the present disclosure.

FIG. 5 is a flowchart of a radio resource monitoring method according to an implementation of the present disclosure.

As shown in FIG. 5, the radio resource monitoring method according to an implementation of the present disclosure, includes: step 502, receiving a target radio resource transmitted from an equipment having base station functionality; step 504, obtaining current information of a terminal, and determining monitoring frequency of any one of neighboring cells in a plurality of neighboring cells adjacent to a serving cell in which the terminal is located according to the current information of the terminal and monitored RSRP and/or monitored RSRQ of the any one of the neighboring cells; step 506, determining a second radio resource of the any one of the neighboring cells according to the target radio resource, and monitoring the second radio resource of the any one of the neighboring cells at the monitoring frequency of the any one of the neighboring cells.

In the technical solution, the terminal can accurately determine the monitoring frequency of any one of the neighboring cells according to the current information of the terminal and the monitored RSRP and/or the monitored RSRQ of the any one of the neighboring cells, so as to avoid monitoring radio resources of any one of the neighboring cells at the same monitoring frequency, which is beneficial to reduce the monitoring overhead of the terminal and lower the monitoring power consumption of the terminal; on the basis that the monitoring frequency of any one of the neighboring cells is determined, since a second radio resource of the any one of the neighboring cells can be determined according to the target radio resource, the terminal can determine radio resources that needs to monitor in any one of the neighboring cells, so as to avoid resulting in an inaccurate monitoring result and higher monitoring overhead due to blindly monitoring all radio resources.

In the above mentioned technical solution, the current information includes, but not limited to: a current location that the terminal is located at and/or the mobility of the terminal; wherein, the current location can be determined according to the signal power of the equipment having base station functionality received by the terminal and/or the signal power of an equipment having base station functionality in the any one of the neighboring cells received by the terminal.

In the technical solution, the current location of the terminal can be accurately determined according to the signal power of the equipment having base station functionality in the serving cell received by the terminal and/or the signal power of an equipment having base station functionality in any one of the neighboring cells received by the terminal. For example, the terminal is located in a center coverage area of the serving cell or an edge coverage area of any one of the neighboring cells. The current location and/or the mobility of the terminal may provide a necessary reference foundation for determining the monitoring frequency of any one of the neighboring cells, which ensures that the terminal can determine the monitoring frequency of any one of the neighboring cells accurately.

In the above mentioned technical solution, the step of determining monitoring frequency of any one of neighboring cells in a plurality of neighboring cells adjacent to a serving cell in which the terminal is located may specifically include: when the terminal is served as low mobility, that is, the mobility of the terminal is poor, namely, the frequency of the terminal crossing the cells is lower, if the signal power of the equipment having base station functionality in the serving cell is greater than or equal to first preset signal power, and/or the RSRP of the any one of the neighboring cells is less than or equal to preset received power and/or the RSRQ of the any one of the neighboring cells is less than or equal to preset received quality, setting the monitoring frequency of the any one of the neighboring cells as 0, or lowering the monitoring frequency of the any one of the neighboring cells to first monitoring frequency; when the mobility of the terminal is the low mobility, that is, the mobility of the terminal is poor, if the signal power of an equipment having base station functionality in the any one of the neighboring cells is greater than or equal to second preset signal power, increasing the monitoring frequency of the any one of the neighboring cells to second monitoring frequency, and reducing monitoring frequency of other neighboring cells in the plurality of the neighboring cells to third monitoring frequency or 0; wherein, the second monitoring frequency is greater than both the third monitoring frequency and the first monitoring frequency.

In the technical solution, when the mobility of the terminal is the lower mobility, if the signal power of the equipment having base station functionality in the serving cell in which the terminal is located is greater than or equal to the first preset signal power, and/or the RSRP of each of the neighboring cells in the plurality of the neighboring cells is less than or equal to the preset received power and/or the RSRQ of each of the neighboring cells in the plurality of the neighboring cells is less than or equal to the preset received quality, it is indicated that the terminal is located at a relatively central location of the coverage area of the serving cell, and is relatively far away from the coverage area of any one of the neighboring cells. At this point, the terminal only needs to monitor the serving cell while not needing to monitor any one of the neighboring cells (namely the monitoring frequency of any one of the neighboring cells is equal to 0) or the terminal can reduce the monitoring frequency of any one of the neighboring cells, so as to reduce the monitoring overhead and relieve the monitoring burden in real time; if the signal power of an equipment having base station functionality in any one of the neighboring cells is greater than or equal to the second preset signal power, it is indicated that the terminal is located in the edge of the any one of the neighboring cells, and is far away from the center of the serving cell and the coverage area of other neighboring cells. Then, the terminal only needs to monitor the serving cell and the any one of the neighboring cells while not needing to monitor the other neighboring cells. Hence, the monitoring frequency of the any one of the neighboring cells needs to be increased to the second monitoring frequency, and the monitoring frequency of the other neighboring cells in the plurality of the neighboring cells needs to be reduced to such as the third monitoring frequency or 0. Thus, the monitoring overhead of the terminal can be efficiently reduced, and the monitoring intensity and the monitoring effect for any one of the neighboring cells are guaranteed.

In the above mentioned technical solution, the step of determining monitoring frequency of any one of neighboring cells in a plurality of neighboring cells adjacent to a serving cell in which the terminal is located may also specifically include: when the terminal is served as high mobility, that is, the mobility of the terminal is high, namely, the frequency of the terminal crossing the cells is higher, increasing the monitoring frequency of the any one of the neighboring cells to fourth monitoring frequency; wherein, the fourth monitoring frequency is greater than the first monitoring frequency.

In the technical solution, when the mobility of the terminal is high, it is indicated that the frequency of the terminal crossing the cells is higher, namely, the terminal may pass through one cell to another frequently. At this time, in order that the terminal can efficiently monitor the radio resources of any one of the neighboring cells, the monitoring frequency of any one of the neighboring cells needs to be increased moderately.

Figure 6:
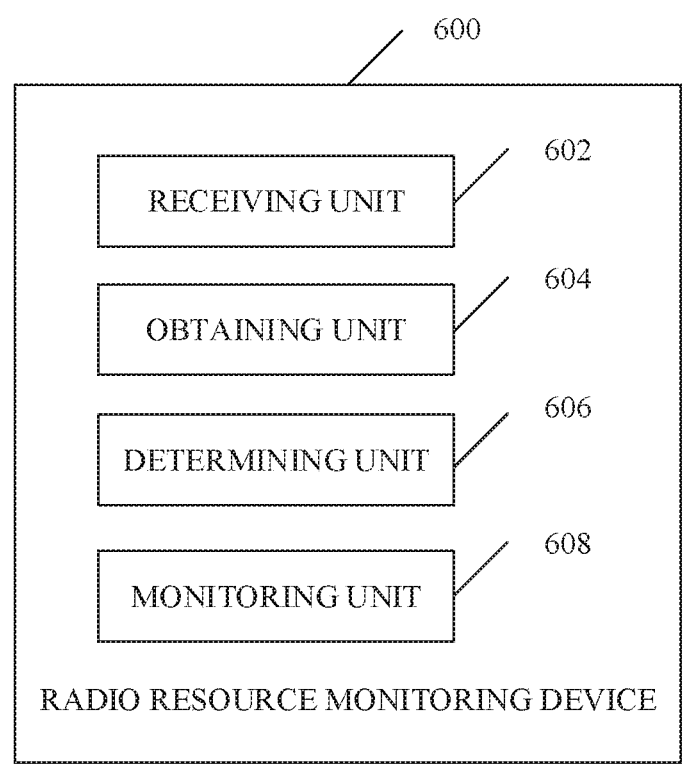
FIG. 6 is a block diagram of a radio resource monitoring device according to an implementation of the present disclosure.

FIG. 6 is a block diagram of a radio resource monitoring device according to an implementation of the present disclosure.

As shown in FIG. 6, the radio resource monitoring device 600 according to an implementation of the present disclosure, includes: a receiving unit 602, which is configured to receive a target radio resource transmitted from an equipment having base station functionality; an obtaining unit 604, which is configured to obtain current information of a terminal; a determining unit 606, which is configured to determine monitoring frequency of any one of neighboring cells in a plurality of neighboring cells adjacent to a serving cell in which the terminal is located according to the current information of the terminal and monitored RSRP and/or monitored RSRQ of the any one of the neighboring cells; and a monitoring unit 608, which is configured to determine a second radio resource of the any one of the neighboring cells according to the target radio resource, and monitor the second radio resource of the any one of the neighboring cells at the monitoring frequency of the any one of the neighboring cells.

In the technical solution, the terminal can accurately determine the monitoring frequency of any one of the neighboring cells according to the current information of the terminal and the monitored RSRP and/or the monitored RSRQ of the any one of the neighboring cells, so as to avoid monitoring radio resources of any one of the neighboring cells at the same monitoring frequency, which is beneficial to reduce the monitoring overhead of the terminal and lower the monitoring power consumption of the terminal; on the basis that the monitoring frequency of any one of the neighboring cells is determined, since the second radio resource of the any one of the neighboring cells can be determined according to the target radio resource, the terminal can determine radio resources that needs to monitor in any one of the neighboring cells, so as to avoid resulting in an inaccurate monitoring result and higher monitoring overhead due to blindly monitoring all radio resources.

In the above mentioned technical solution, the current information includes, but not limited to: a current location that the terminal is located at and/or the mobility of the terminal; the determining unit 606 is configured to determine the current location according to the signal power of the equipment having base station functionality received by the terminal and/or the signal power of an equipment having base station functionality in the any one of the neighboring cells received by the terminal.

In the technical solution, the current location of the terminal can be accurately determined according to the signal power of the equipment having base station functionality in the serving cell received by the terminal and/or the signal power of an equipment having base station functionality in any one of the neighboring cells received by the terminal. For example, the terminal is located in a center coverage area of the serving cell or an edge coverage area of any one of the neighboring cells. The current location and/or the mobility of the terminal may provide a necessary reference foundation for determining the monitoring frequency of any one of the neighboring cells, which ensures that the terminal can determine the monitoring frequency of any one of the neighboring cells accurately.

In the above mentioned technical solution, the determining unit 606 is specifically configured to: when the terminal is served as low mobility, that is, the mobility of the terminal is poor, namely, the frequency of the terminal crossing the cells is lower, if the signal power of the equipment having base station functionality in the serving cell is greater than or equal to first preset signal power, and/or the RSRP of the any one of the neighboring cells is less than or equal to preset received power and/or the RSRQ of the any one of the neighboring cells is less than or equal to preset received quality, set the monitoring frequency of the any one of the neighboring cells as 0, or lower the monitoring frequency of the any one of the neighboring cells to first monitoring frequency; when the mobility of the terminal is the low mobility, that is, the mobility of the terminal is poor, if the signal power of an equipment having base station functionality in the any one of the neighboring cells is greater than or equal to second preset signal power, increase the monitoring frequency of the any one of the neighboring cells to second monitoring frequency, and reduce monitoring frequency of other neighboring cells in the plurality of the neighboring cells to third monitoring frequency or 0; wherein, the second monitoring frequency is greater than both the third monitoring frequency and the first monitoring frequency.

In the technical solution, when the mobility of the terminal is the lower mobility, if the signal power of the equipment having base station functionality in the serving cell in which the terminal is located is greater than or equal to the first preset signal power, and/or the RSRP of each of the neighboring cells in the plurality of the neighboring cells is less than or equal to the preset received power and/or the RSRQ of each of the neighboring cells in the plurality of the neighboring cells is less than or equal to the preset received quality, it is indicated that the terminal is located at a relatively central location of the coverage area of the serving cell, and is relatively far away from the coverage area of any one of the neighboring cells. At this point, the terminal only needs to monitor the serving cell while not needing to monitor any one of the neighboring cells (namely the monitoring frequency of any one of the neighboring cells is equal to 0) or the terminal can reduce the monitoring frequency of any one of the neighboring cells, so as to reduce the monitoring overhead and relieve the monitoring burden in real time; if the signal power of an equipment having base station functionality in any one of the neighboring cells is greater than or equal to the second preset signal power, it is indicated that the terminal is located in the edge of the any one of the neighboring cells, and is far away from the center of the serving cell and the coverage area of other neighboring cells. Then, the terminal only needs to monitor the serving cell and the any one of the neighboring cells while not needing to monitor the other neighboring cells. Hence, the monitoring frequency of the any one of the neighboring cells needs to be increased to the second monitoring frequency, and the monitoring frequency of the other neighboring cells in the plurality of the neighboring cells needs to be reduced to such as the third monitoring frequency or 0. Thus, the monitoring overhead of the terminal can be efficiently reduced, and the monitoring intensity and the monitoring effect for any one of the neighboring cells are guaranteed.

In the above mentioned technical solution, the determining unit 606 is also specifically configured to: when the terminal is served as high mobility, that is, the mobility of the terminal is high, namely, the frequency of the terminal crossing the cells is higher, increase the monitoring frequency of the any one of the neighboring cells to fourth monitoring frequency; wherein, the fourth monitoring frequency is greater than the first monitoring frequency.

In the technical solution, when the mobility of the terminal is high, it is indicated that the frequency of the terminal crossing the cells is higher, namely, the terminal may pass through one cell to another frequently. At this time, in order that the terminal can efficiently monitor the radio resources of any one of the neighboring cells, the monitoring frequency of any one of the neighboring cells needs to be increased moderately.

Figure 7:
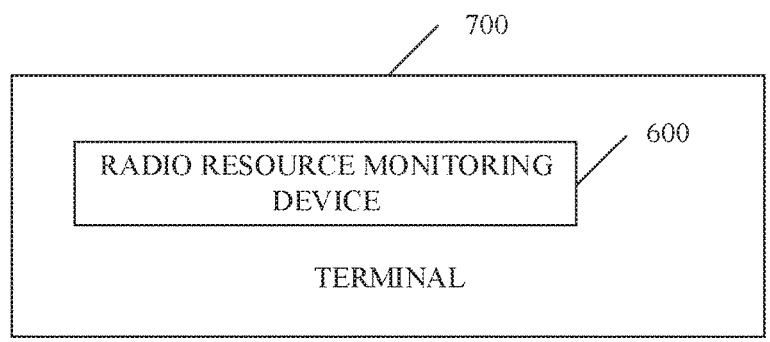
FIG. 7 is a block diagram of a terminal according to an implementation of the present disclosure.

FIG. 7 is a block diagram of a terminal according to an implementation of the present disclosure.

As shown in FIG. 7, the terminal 700 according to an implementation of the present disclosure includes the radio resource monitoring device 600 as described according to any one of the above mentioned technical solutions.

In the technical solution, by means of setting the radio resource monitoring device 600 in the terminal 700, the terminal 700 can accurately determine monitoring frequency of any one of neighboring cells in a plurality of neighboring cells adjacent to a serving cell in which the terminal is located, so as to avoid monitoring radio resources of any one of the neighboring cells at the same monitoring frequency, which is beneficial to reduce the monitoring overhead of the terminal and lower the monitoring power consumption of the terminal; at the same time, the terminal can determine radio resources that needs to monitor in any one of the neighboring cells, so as to avoid resulting in an inaccurate monitoring result and higher monitoring overhead due to blindly monitoring all radio resources.

Figure 8:
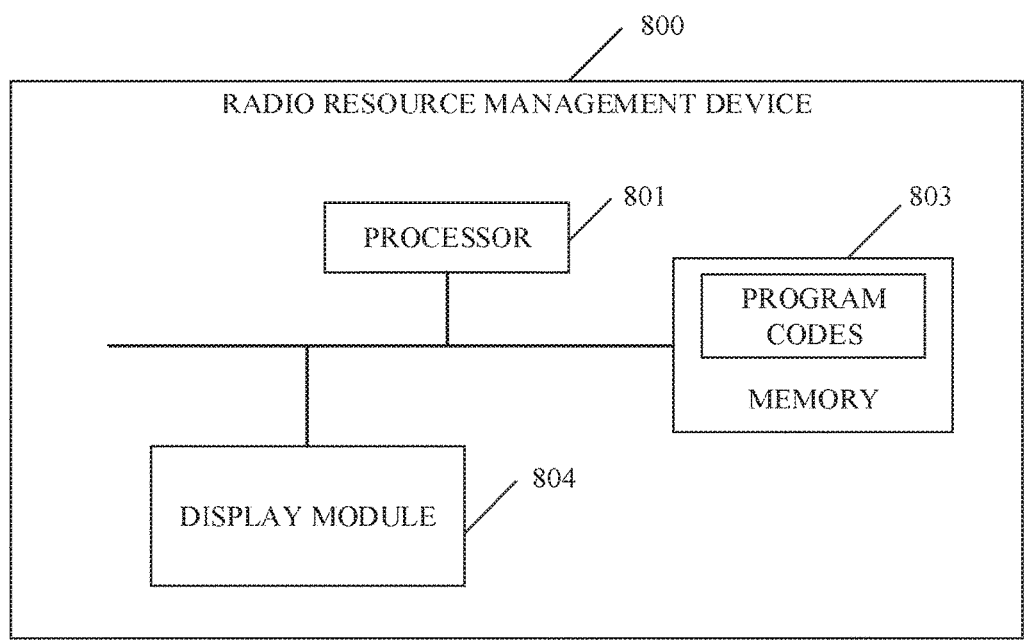
FIG. 8 is a block diagram of a radio resource management device according to another implementation of the present disclosure.

Referring to FIG. 8, FIG. 8 is a block diagram of a radio resource management device according to another implementation of the present disclosure.

As shown in FIG. 8, the radio resource management device 800 is applied to an equipment having base station functionality, and at least includes: at least one processor 801, such as a CPU (central processing unit), at least one communication bus 802, a memory 803 and a display module 804. The communication bus 802 is configured to realize the connections and communications of the at least one processor 801, the memory 803 and the display module 804. The display module 804 is configured to display visual information, such as text, images, for example. The display module 804 may be a light emitting diode (LED) display screen or an organic light emitting diode (OLED) display screen. The memory 803 may be a high speed RAM (Random Access Memory) memory, and can also be a non-volatile memory, such as magnetic disk storage. The memory 803 may store a group of grogram codes or computer programs for implementing processes, and the processor 801 can call and read the grogram codes or computer programs stored in the memory 803 to execute for the following operations:

obtaining a first radio resource of a serving cell in which a terminal is located, and a second radio resource of any one of neighboring cells in a plurality of neighboring cells adjacent to the serving cell; and differentiating the first radio resource and the second radio resource to obtain a target radio resource, and transmitting the target radio resource to the terminal.

In the technical solution, the processor 801 calls and reads the grogram codes or computer programs stored in the memory 803 to execute for differentiating the first radio resource and the second radio resource to obtain a target radio resource, includes:

differentiating between the same radio resources and different radio resources of both the first radio resource and the second radio resource, marking differentiated same radio resources and differentiated different radio resources respectively so as to identify target cells that the same radio resources belong to and target cells that the different radio resources belong to, and taking marked same radio resources and marked different radio resources as the target radio resource; wherein, the target cell is the serving cell or any one of the neighboring cells.

In the technical solution, the processor 801 calls and reads the grogram codes or computer programs stored in the memory 803 to execute for differentiating the first radio resource and the second radio resource to obtain a target radio resource, further includes:

determining periodically whether the first radio resource and/or the second radio resource change(s) or not, obtaining a first changed radio resource corresponding to the first radio resource and/or obtaining a second changed radio resource corresponding to the second radio resource when the first radio resource and/or the second radio resource change(s), differentiating the first changed radio resource and/or the second changed radio resource, and taking differentiated first changed radio resource and/or differentiated second changed radio resource as the target radio resource.

Figure 9:
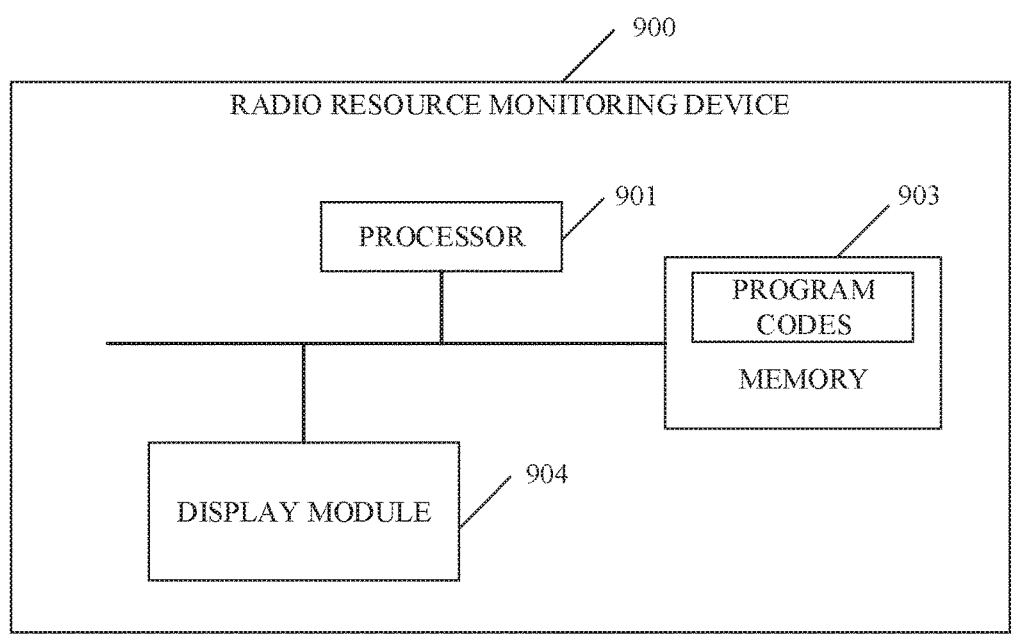
FIG. 9 is a block diagram of a radio resource monitoring device according to another implementation of the present disclosure.

Referring to FIG. 9, FIG. 9 is a block diagram of a radio resource monitoring device according to another implementation of the present disclosure.

As shown in FIG. 9, the radio resource monitoring device 900 is applied to a terminal, and the terminal is located in a serving cell controlled by an equipment having base station functionality.

The radio resource monitoring device 900 can include: at least one processor 901, such as a CPU (central processing unit), at least one communication bus 902, a memory 903 and a display module 904. The communication bus 902 is configured to realize the connections and communications of the at least one processor 901, the memory 903 and the display module 904. The display module 904 is configured to display visual information, such as text, images, for example. The display module 904 may be a light emitting diode (LED) display screen or an organic light emitting diode (OLED) display screen. The memory 903 may be a high speed RAM memory, and can also be a non-volatile memory, such as magnetic disk storage. The memory 903 may store a group of grogram codes or computer programs for implementing processes, and the processor 901 can call and read the grogram codes or computer programs stored in the memory 903 to execute for the following operations:

receiving a target radio resource transmitted from the equipment having base station functionality;

obtaining current information of the terminal;

determining monitoring frequency of any one of neighboring cells in a plurality of neighboring cells adjacent to the serving cell in which the terminal is located according to the current information of the terminal and monitored reference signal received power (RSRP) and/or monitored reference signal received quality (RSRQ) of the any one of the neighboring cells; and determining a second radio resource of the any one of the neighboring cells according to the target radio resource, and monitoring the second radio resource of the any one of the neighboring cells at the monitoring frequency of the any one of the neighboring cells.

In the technical solution, the current information comprises: a current location that the terminal is located at and/or the mobility of the terminal.

In the technical solution, the current location is determined according to the signal power of the equipment having base station functionality received by the terminal and/or the signal power of an equipment having base station functionality in the any one of the neighboring cells received by the terminal.

In the technical solution, the processor 901 calls and reads the grogram codes or computer programs stored in the memory 903 to execute for determining monitoring frequency of any one of neighboring cells in a plurality of neighboring cells adjacent to the serving cell in which the terminal is located, includes:

when the mobility of the terminal is poor, if the signal power of the equipment having base station functionality is greater than or equal to first preset signal power, and/or the RSRP of the any one of the neighboring cells is less than or equal to preset received power and/or the RSRQ of the any one of the neighboring cells is less than or equal to preset received quality, setting the monitoring frequency of the any one of the neighboring cells as 0, or lowering the monitoring frequency of the any one of the neighboring cells to first monitoring frequency; and when the mobility of the terminal is poor, if the signal power of the equipment having base station functionality in the any one of the neighboring cells is greater than or equal to second preset signal power, increasing the monitoring frequency of the any one of the neighboring cells to second monitoring frequency, and reducing monitoring frequency of other neighboring cells in the plurality of the neighboring cells to third monitoring frequency or 0; wherein, the second monitoring frequency is greater than both the third monitoring frequency and the first monitoring frequency.

In the technical solution, the processor 901 calls and reads the grogram codes or computer programs stored in the memory 903 to execute for determining monitoring frequency of any one of neighboring cells in a plurality of neighboring cells adjacent to the serving cell in which the terminal is located, further includes:

when the mobility of the terminal is high, increasing the monitoring frequency of the any one of the neighboring cells to fourth monitoring frequency; wherein, the fourth monitoring frequency is greater than the first monitoring frequency.

In combination with drawings, the technical solutions of the present disclosure as illustrated above in detail enable a UE to identify a radio resource of any cell, so that a terminal can avoid blindly monitoring the radio resources of all cells; at the same time, according to the current actual location of the UE, its mobility, and/or the reception power and reception quality of the reference signals of neighboring cells, the UE determines the monitoring frequency of the neighboring cells, while not needing to monitor the resource pool information of each of the neighboring cells at the same frequency; thus the monitoring overhead of the UE and the radio resource overhead of the system are reduced.

According to an implementation of the present disclosure, a program product stored in a non-volatile machine readable medium and used for radio resource management is further provided. The program product includes machine executable instructions which are used to enable a computer system to execute for: obtaining a first radio resource of a serving cell in which a terminal is located, and a second radio resource of any one of neighboring cells in a plurality of neighboring cells adjacent to the serving cell; and differentiating the first radio resource and the second radio resource to obtain a target radio resource, and transmitting the target radio resource to the terminal.

According to implementations of the present disclosure, a non-volatile machine readable medium storing a program product used for radio resource management of a terminal is also provided. The program product includes machine executable instructions which are used to enable a computer system to execute for: obtaining a first radio resource of a serving cell in which a terminal is located, and a second radio resource of any one of neighboring cells in the plurality of neighboring cells of the serving cell; and differentiating the first radio resource and the second radio resource to obtain a target radio resource, and transmitting the target radio resource to the terminal.

According to implementations of the present disclosure, a machine readable program is also provided. The machine readable program enables a machine to execute the radio resource management method according to any one of the above mentioned technical solutions.

According to implementations of the present disclosure, a storage medium storing a machine readable program is also provided; wherein, the machine readable program enables a machine to execute the radio resource management method according to any one of the above mentioned technical solutions.

According to implementations of the present disclosure, a program product stored in a non-volatile machine readable medium and used for radio resource monitoring is further provided. The program product includes machine executable instructions which are used to enable a computer system to execute for: receiving a target radio resource transmitted from an equipment having base station functionality; obtaining current information of a terminal, and determining monitoring frequency of any one of neighboring cells in a plurality of neighboring cells adjacent to a serving cell in which the terminal is located according to the current information of the terminal and monitored RSRP and/or monitored RSRQ of the any one of the neighboring cells; and determining a second radio resource of the any one of the neighboring cells according to the target radio resource, and monitoring the second radio resource of the any one of the neighboring cells at the monitoring frequency of the any one of the neighboring cells.

According to implementations of the present disclosure, a non-volatile machine readable medium storing a program product used for radio resource monitoring of a terminal is also provided. The program product includes machine executable instructions which are used to enable a computer system to execute for: receiving a target radio resource transmitted from an equipment having base station functionality; obtaining current information of a terminal, and determining monitoring frequency of any one of neighboring cells in a plurality of neighboring cells adjacent to a serving cell in which the terminal is located according to the current information of the terminal and monitored RSRP and/or monitored RSRQ of the any one of the neighboring cells; and determining a second radio resource of the any one of the neighboring cells according to the target radio resource, and monitoring the second radio resource of the any one of the neighboring cells at the monitoring frequency of the any one of the neighboring cells.

According to implementations of the present disclosure, a machine readable program is also provided. The machine readable program enables a machine to execute the radio resource monitoring method according to any one of the above mentioned technical solutions.

According to implementations of the present disclosure, a storage medium storing a machine readable program is also provided; wherein, the machine readable program enables a machine to execute the radio resource monitoring method according to any one of the above mentioned technical solutions.

In the present disclosure, the terms "first", "second", "third", and "fourth" are only used for description instead of being used to indicate or imply relative importance; the meaning of the term "plurality of" is two or more than two. While the present disclosure has been described with reference to particular implementations, it will be understood that the implementations are illustrative and that the disclosure scope is not so limited. Alternative implementations of the present disclosure will become apparent to those having ordinary skill in the art to which the present disclosure pertains. Such alternate implementations are considered to be encompassed within the spirit and scope of the present disclosure.

What is claimed is:

1. A method of radio resource management for an equipment having base station functionality, comprising:
   obtaining a first radio resource of a serving cell in which a terminal is located, and a second radio resource of any one of neighboring cells in a plurality of neighboring cells adjacent to the serving cell, wherein the first radio resource and the second radio resource comprise resource pool information;
   obtaining current information of the terminal;
   determining a monitoring frequency of any one of the neighboring cells in the plurality of neighboring cells, according to the current information of the terminal and at least one of monitored reference signal received power (RSRP) and monitored reference signal received quality (RSRQ) of the any one of the neighboring cells;
   differentiating the first radio resource and the second radio resource to obtain a target radio resource, and transmitting the target radio resource to the terminal;
   differentiating between the same radio resources and different radio resources, respectively, from both the first radio resource and the second radio resource;
   marking the differentiated same radio resources and the differentiated different radio resources respectively to identify target cells that the same radio resources belong to and target cells that the different radio resources belong to; and
   taking the marked same radio resources and the marked different radio resources as the target radio resource, wherein, the target cell is the serving cell or any one of the neighboring cells,
   wherein the current information comprises at least one of: a current location that the terminal is located at, and mobility of the terminal,
   wherein the current location is determined according to at least one of signal power of the equipment having the base station functionality received by the terminal and signal power of an equipment having the base station functionality in the any one of the neighboring cells received by the terminal, wherein determining the monitoring frequency of the any one of neighboring cells in the plurality of neighboring cells adjacent to the serving cell in which the terminal is located comprises:

when the mobility of the terminal is high, increasing the monitoring frequency of the any one of the neighboring cells to a fourth monitoring frequency, wherein the fourth monitoring frequency is greater than a first monitoring frequency;

when the mobility of the terminal is low, further when at least one of the signal power of the equipment having the base station functionality is greater than or equal to first preset signal power, the RSRP of the any one of the neighboring cells is less than or equal to preset received power, and the RSRQ of the any one of the neighboring cells is less than or equal to preset received quality, setting the monitoring frequency of the any one of the neighboring cells as 0, or lowering the monitoring frequency of the any one of the neighboring cells to a first monitoring frequency; or when the mobility of the terminal is low, further when the signal power of the equipment having the base station functionality in the any one of the neighboring cells is greater than or equal to second preset signal power, increasing the monitoring frequency of the any one of the neighboring cells to a second monitoring frequency, and reducing the monitoring frequency of other neighboring cells in the plurality of the neighboring cells to a third monitoring frequency or 0, wherein the second monitoring frequency is greater than both the third monitoring frequency and the first monitoring frequency; or when at least one of the signal power of the equipment having the base station functionality is greater than or equal to first preset signal power, the RSRP of the any one of the neighboring cells is less than or equal to preset received power, and the RSRQ of the any one of the neighboring cells is less than or equal to preset received quality, setting the monitoring frequency of the any one of the neighboring cells as 0, or lowering the monitoring frequency of the any one of the neighboring cells to a first monitoring frequency; and when the signal power of the equipment having the base station functionality in the any one of the neighboring cells is greater than or equal to second preset signal power, increasing the monitoring frequency of the any one of the neighboring cells to a second monitoring frequency, and reducing the monitoring frequency of other neighboring cells in the plurality of the neighboring cells to a third monitoring frequency or 0, wherein the second monitoring frequency is greater than both the third monitoring frequency and the first monitoring frequency.

2. The method of claim 1, wherein differentiating the first radio resource and the second radio resource to obtain a target radio resource comprises:

determining periodically whether at least one of the first radio resource and the second radio resource changes;

obtaining at least one of a first changed radio resource corresponding to the first radio resource and a second changed radio resource corresponding to the second radio resource when at least one of the first radio resource and the second radio resource changes;

differentiating at least one of the first changed radio resource and the second changed radio resource; and taking at least one of the differentiated first changed radio resource and the differentiated second changed radio resource as the target radio resource.

3. A device of radio resource management for an equipment having base station functionality, comprising:

at least one processor; and a memory connected to the processor through at least one communication bus, wherein the memory stores a group of program codes, and the processor is configured to call the program codes stored in the memory to:

obtain a first radio resource of a serving cell in which a terminal is located, and a second radio resource of any one of neighboring cells in a plurality of neighboring cells adjacent to the serving cell, wherein the first radio resource and the second radio resource comprise resource pool information obtain current information of the terminal;

determine a monitoring frequency of any one of the neighboring cells in the plurality of neighboring cells, according to the current information of the terminal and at least one of monitored reference signal received power (RSRP) and monitored reference signal received quality (RSRQ) of the any one of the neighboring cells;

differentiate the first radio resource and the second radio resource to obtain a target radio resource, and transmitting the target radio resource to the terminal;

differentiate between the same radio resources and different radio resources, respectively, from both the first radio resource and the second radio resource;

mark the differentiated same radio resources and the differentiated different radio resources respectively to identify target cells that the same radio resources belong to and target cells that the different radio resources belong to; and take the marked same radio resources and the marked different radio resources as the target radio resource, wherein the target cell is the serving cell or any one of the neighboring cells, wherein the current information comprises at least one of: a current location that the terminal is located at, and mobility of the terminal, wherein the current location is determined according to at least one of signal power of the equipment having the base station functionality received by the terminal and signal power of an equipment having the base station functionality in the any one of the neighboring cells received by the terminal, wherein the program codes stored in the memory to determine the monitoring frequency of the any one of neighboring cells in the plurality of neighboring cells adjacent to the serving cell in which the terminal is located comprises:

when the mobility of the terminal is high, increase the monitoring frequency of the any one of the neighboring cells to a fourth monitoring frequency, wherein the fourth monitoring frequency is greater than a first monitoring frequency;

when the mobility of the terminal is low, further when at least one of the signal power of the equipment having the base station functionality is greater than or equal to first preset signal power, the RSRP of the any one of the neighboring cells is less than or equal to preset received power, and the RSRQ of the any one of the neighboring cells is less than or equal to preset received quality, set the monitoring frequency of the any one of the neighboring cells as 0, or lower the monitoring frequency of the any one of the neighboring cells to a first monitoring frequency; or when the mobility of the terminal is low, further when the signal power of the equipment having the base station functionality in the any one of the neighboring cells is greater than or equal to second preset signal power, increase the monitoring frequency of the any one of the neighboring cells to a second monitoring frequency, and reduce the monitoring frequency of other neighboring cells in the plurality of the neighboring cells to a third monitoring frequency or 0, wherein the second monitoring frequency is greater than both the third monitoring frequency and the first monitoring frequency; or when at least one of the signal power of the equipment having the base station functionality is greater than or equal to first preset signal power, the RSRP of the any one of the neighboring cells is less than or equal to preset received power, and the RSRQ of the any one of the neighboring cells is less than or equal to preset received quality, set the monitoring frequency of the any one of the neighboring cells as 0, or lower the monitoring frequency of the any one of the neighboring cells to a first monitoring frequency; and when the signal power of the equipment having the base station functionality in the any one of the neighboring cells is greater than or equal to second preset signal power, increase the monitoring frequency of the any one of the neighboring cells to a second monitoring frequency, and reduce the monitoring frequency of other neighboring cells in the plurality of the neighboring cells to a third monitoring frequency or 0, wherein the second monitoring frequency is greater than both the third monitoring frequency and the first monitoring frequency.

4. The device of claim 3, wherein the program codes stored in the memory to differentiate the first radio resource and the second radio resource to obtain a target radio resource comprises further program codes to:
determine periodically whether at least one of the first radio resource and the second radio resource changes;
obtain at least one of a first changed radio resource corresponding to the first radio resource and a second changed radio resource corresponding to the second radio resource when at least one of the first radio resource and the second radio resource changes;
differentiate at least one of the first changed radio resource and the second changed radio resource; and
take at least one of the differentiated first changed radio resource and the differentiated second changed radio resource as the target radio resource.

5. A method of radio resource monitoring for a terminal located in a serving cell controlled by an equipment having base station functionality, comprising:
obtaining a target radio resource;
obtaining current information of the terminal, and determining a monitoring frequency of any one of neighboring cells in a plurality of neighboring cells adjacent to the serving cell in which the terminal is located, according to the current information of the terminal and at least one of monitored reference signal received power (RSRP) and monitored reference signal received quality (RSRQ) of the any one of the neighboring cells;

determining a second radio resource of the any one of the neighboring cells according to the target radio resource, and monitoring the second radio resource of the any one of the neighboring cells at the monitoring frequency of the any one of the neighboring cells, wherein the target radio resource and the second radio resource comprise resource pool information; and
transmitting the target radio resource to the terminal,
wherein obtaining a target radio resource includes:
differentiating between the same radio resources and different radio resources, respectively, from both a first radio resource and the second radio resource;
marking the differentiated same radio resources and the differentiated different radio resources respectively to identify target cells that the same radio resources belong to and target cells that the different radio resources belong to; and
taking the marked same radio resources and the marked different radio resources as the target radio resource, wherein, the target cell is the serving cell or any one of the neighboring cells,
wherein the current information comprises at least one of: a current location that the terminal is located at, and mobility of the terminal,
wherein the current location is determined according to at least one of signal power of the equipment having the base station functionality received by the terminal and signal power of an equipment having the base station functionality in the any one of the neighboring cells received by the terminal,
wherein determining the monitoring frequency of the any one of neighboring cells in the plurality of neighboring cells adjacent to the serving cell in which the terminal is located comprises:
when the mobility of the terminal is high, increasing the monitoring frequency of the any one of the neighboring cells to a fourth monitoring frequency, wherein the fourth monitoring frequency is greater than a first monitoring frequency;
when the mobility of the terminal is low, further when at least one of the signal power of the equipment having the base station functionality is greater than or equal to first preset signal power, the RSRP of the any one of the neighboring cells is less than or equal to preset received power, and the RSRQ of the any one of the neighboring cells is less than or equal to preset received quality, setting the monitoring frequency of the any one of the neighboring cells as 0, or lowering the monitoring frequency of the any one of the neighboring cells to a first monitoring frequency; or
when the mobility of the terminal is low, further when the signal power of the equipment having the base station functionality in the any one of the neighboring cells is greater than or equal to second preset signal power, increasing the monitoring frequency of the any one of the neighboring cells to a second monitoring frequency, and reducing the monitoring frequency of other neighboring cells in the plurality of the neighboring cells to a third monitoring frequency or 0, wherein the second monitoring frequency is greater than both the third monitoring frequency and the first monitoring frequency; or
when at least one of the signal power of the equipment having the base station functionality is greater than or equal to first preset signal power, the RSRP of the any one of the neighboring cells is less than or equal to preset received power, and the RSRQ of the any one of the neighboring cells is less than or equal to preset received quality, setting the monitoring frequency of the any one of the neighboring cells as 0, or lowering the monitoring frequency of the any one of the neighboring cells to a first monitoring frequency; and when the signal power of the equipment having the base station functionality in the any one of the neighboring cells is greater than or equal to second preset signal power, increasing the monitoring frequency of the any one of the neighboring cells to a second monitoring frequency, and reducing the monitoring frequency of other neighboring cells in the plurality of the neighboring cells to a third monitoring frequency or 0, wherein the second monitoring frequency is greater than both the third monitoring frequency and the first monitoring frequency.

6. A device of radio resource monitoring for a terminal located in a serving cell controlled by an equipment having base station functionality, comprising:
at least one processor; and
a memory connected to the processor through at least one communication bus, wherein the memory stores program codes, and the processor is configured to execute the program codes stored in the memory to:
obtain a target radio resource;
obtain current information of the terminal;
determine a monitoring frequency of any one of neighboring cells in a plurality of neighboring cells adjacent to the serving cell in which the terminal is located according to at least one of the current information of the terminal and monitored RSRP and monitored RSRQ of the any one of the neighboring cells;
determine a second radio resource of the any one of the neighboring cells according to the target radio resource, and monitoring the second radio resource of the any one of the neighboring cells at the monitoring frequency of the any one of the neighboring cells, wherein the target radio resource and the second radio resource comprise resource pool information; and
transmit the target radio resource to the terminal,
wherein the program codes stored in the memory to obtain the target radio resource further comprises program codes to:
differentiate between the same radio resources and different radio resources, respectively, from both a first radio resource and the second radio resource;
mark the differentiated same radio resources and the differentiated different radio resources respectively to identify target cells that the same radio resources belong to and target cells that the different radio resources belong to; and
take the marked same radio resources and the marked different radio resources as the target radio resource, wherein the target cell is the serving cell or any one of the neighboring cells,
wherein the current information comprises at least one of:
a current location that the terminal is located at, and mobility of the terminal,
wherein the current location is determined according to at least one of signal power of the equipment having the base station functionality received by the terminal and signal power of the equipment having the base station functionality in the any one of the neighboring cells received by the terminal,
wherein the program codes stored in the memory to determine the monitoring frequency of the any one of neighboring cells in a plurality of neighboring cells adjacent to the serving cell in which the terminal is located further comprises program codes to:
when the mobility of the terminal is high, increase the monitoring frequency of the any one of the neighboring cells to a fourth monitoring frequency, wherein the fourth monitoring frequency is greater than a first monitoring frequency;
when the mobility of the terminal is low, further when at least one of the signal power of the equipment having the base station functionality is greater than or equal to first preset signal power, the RSRP of the any one of the neighboring cells is less than or equal to preset received power, and the RSRQ of the any one of the neighboring cells is less than or equal to preset received quality, set the monitoring frequency of the any one of the neighboring cells as 0, or lower the monitoring frequency of the any one of the neighboring cells to a first monitoring frequency; or
when the mobility of the terminal is low, further when the signal power of the equipment having the base station functionality in the any one of the neighboring cells is greater than or equal to second preset signal power, increase the monitoring frequency of the any one of the neighboring cells to a second monitoring frequency, and reduce the monitoring frequency of other neighboring cells in the plurality of the neighboring cells to a third monitoring frequency or 0, wherein the second monitoring frequency is greater than both the third monitoring frequency and the first monitoring frequency; or
when at least one of the signal power of the equipment having the base station functionality is greater than or equal to first preset signal power, the RSRP of the any one of the neighboring cells is less than or equal to preset received power, and the RSRQ of the any one of the neighboring cells is less than or equal to preset received quality, set the monitoring frequency of the any one of the neighboring cells as 0, or lower the monitoring frequency of the any one of the neighboring cells to a first monitoring frequency; and
when the signal power of the equipment having the base station functionality in the any one of the neighboring cells is greater than or equal to second preset signal power, increase the monitoring frequency of the any one of the neighboring cells to a second monitoring frequency, and reduce the monitoring frequency of other neighboring cells in the plurality of the neighboring cells to a third monitoring frequency or 0, wherein the second monitoring frequency is greater than both the third monitoring frequency and the first monitoring frequency.

* * * * *